(12) United States Patent
Yang et al.

(10) Patent No.: US 8,621,583 B2
(45) Date of Patent: Dec. 31, 2013

(54) SENSOR-BASED AUTHENTICATION TO A COMPUTER NETWORK-BASED SERVICE

(75) Inventors: Fan Yang, Beijing (CN); Jacky Shen, Beijing (CN); Feng Zhao, Issaquah, WA (US); Ivan Beschastnikh, Seattle, WA (US); Amre Shakimov, Durham, NC (US)

(73) Assignee: Microsoft Corporation, Redmond, WA (US)

( * ) Notice: Subject to any disclaimer, the term of this patent is extended or adjusted under 35 U.S.C. 154(b) by 308 days.

(21) Appl. No.: 12/780,584

(22) Filed: May 14, 2010

(65) Prior Publication Data
US 2011/0283338 A1 Nov. 17, 2011

(51) Int. Cl.
*H04L 29/06* (2006.01)
(52) U.S. Cl.
USPC .............................. 726/6; 713/182
(58) Field of Classification Search
USPC .................................................. 726/6
See application file for complete search history.

(56) References Cited

U.S. PATENT DOCUMENTS

| | | | | |
|---|---|---|---|---|
| 5,689,638 | A * | 11/1997 | Sadovsky ........................ | 726/21 |
| 6,720,860 | B1 | 4/2004 | Narayanaswami | |
| 2001/0047488 | A1* | 11/2001 | Verplaetse et al. ............ | 713/202 |
| 2003/0135740 | A1 | 7/2003 | Talmor et al. | |
| 2003/0158815 | A1* | 8/2003 | Yoshida et al. ................. | 705/50 |
| 2004/0192256 | A1 | 9/2004 | Kuwajima | |
| 2004/0205176 | A1 | 10/2004 | Ting et al. | |
| 2004/0230826 | A1* | 11/2004 | Birkhoelzer et al. ......... | 713/200 |
| 2004/0249961 | A1* | 12/2004 | Katsube et al. ............... | 709/229 |
| 2005/0138385 | A1* | 6/2005 | Friedli et al. .................. | 713/182 |
| 2006/0279732 | A1 | 12/2006 | Wang | |
| 2007/0026372 | A1 | 2/2007 | Huelsbergen | |
| 2007/0143824 | A1 | 6/2007 | Shahbazi | |
| 2007/0186106 | A1* | 8/2007 | Ting et al. ..................... | 713/168 |
| 2007/0282757 | A1 | 12/2007 | Pandya et al. | |
| 2007/0293194 | A1 | 12/2007 | Bisht | |
| 2007/0297610 | A1 | 12/2007 | Chen | |
| 2007/0300307 | A1* | 12/2007 | Duncan .......................... | 726/27 |
| 2008/0059804 | A1 | 3/2008 | Shah et al. | |
| 2009/0164795 | A1 | 6/2009 | Justus et al. | |
| 2009/0205035 | A1 | 8/2009 | Sermersheim et al. | |

(Continued)

OTHER PUBLICATIONS

Bowman, P., J. Ng, M. Harrison, T. S. López, Sensor based condition monitoring, BRIDGE—Building Radio frequency IDentification solutions for the Global Environment, Jun. 2009, pp. 1-95.

(Continued)

*Primary Examiner* — Yogesh Paliwal
(74) *Attorney, Agent, or Firm* — Lyon & Harr, LLP; Richard T. Lyon (57) ABSTRACT

Sensor-based authentication technique embodiments are presented which generally employ sensor readings captured by a user's computing device (such as a mobile computing device like a cell phone, smart phone, PDA, and so on) to authenticate the user's access to a computer network-based service (such as a web-service) that is secured with traditional textual passwords. These traditional passwords are saved in an off-device password repository service. The aforementioned sensor readings are not cached on the user's computing device and are immediately streamed to the password repository service, where they are validated against a pre-arranged, known sensor-based password. If the validation succeeds, access to the password protected service is brokered by the password repository service on behalf of the user using the appropriate traditional password, and the user's computing device is granted access.

17 Claims, 4 Drawing Sheets

(56) References Cited

U.S. PATENT DOCUMENTS

| | | |
|---|---|---|
| 2009/0309698 A1 | 12/2009 | Headley et al. |
| 2010/0037046 A1 | 2/2010 | Ferg et al. |
| 2010/0049526 A1 | 2/2010 | Lewis et al. |

OTHER PUBLICATIONS

Saroiu, S., A. Wolman, I am a sensor, and I approve this message, Proc. of the Eleventh Workshop on Mobile Computing Systems & Applications, HotMobile '10, Feb. 22-23, 2010, pp. 37-42, Annapolis, Maryland, USA.

Abadi, M., T. Mark A. Lomas, R. Needham, Strengthening passwords, SRC Technical Note, Sep. 1997, pp. 1-11.

Adams, A., M. A. Sasse, Users are not the enemy, Commun. of the ACM, Dec. 1999, pp. 40-46, vol. 42, No. 12.

Atwood, M., et al, OAuth Core 1.0, Dec. 4, 2007, from http://oauth.net/core/1.0/, pp. 1-25.

Corner, M. D., B. Noble, Zero-interaction authentication, Proc. of the Eighth Annual Int'l Conf. on Mobile Computing and Networking, MOBICOM 2002, Sep. 23-28, 2002, pp. 1-11, Atlanta, Georgia, USA.

Gamboa, H., Webbiometrics: User verification via web interaction, Biometrics Symposium, Sep. 11-13, 2007, pp. 1-6.

Gouda, M. G., A. X. Liu, L. M. Leung, M. A. Alam, SPP: An anti-phishing single password protocol, Computer Networks, Sep. 2007, pp. 3715-3726, vol. 51, No. 13.

Griffin, J., Study: Consumers would welcome voice verification, http://www.securityinfowatch.com/news/10555016/study-us-consumers-would-welcome-voice-verification, Jun. 19, 2008, pp. 2.

Halderman, J. A., B. Waters, E. W. Felten, A convenient method for securely managing passwords, Proc. of the 14th Int'l Conf. on World Wide Web, WWW 2005, May 10-14, 2005, pp. 471-479, Chiba, Japan.

Inglesant, P., M. A. Sasse, The true cost of unusable password policies: Password use in the wild, Proc. of the 28th Int'l Conf. on Human Factors in Computing Systems, CHI 2010, Apr. 10-15, 2010, pp. 383-392, Atlanta, Georgia, USA.

Ives, B., K. R. Walsh, H. Schneider, The domino effect of password reuse, Commun. ACM, May 2004, pp. 75-78, vol. 47, No. 4.

Kelsey, J., B. Schneier, C. Hall, D. Wagner, Secure applications of low-entropy keys, Proc. of the First Int'l Workshop on Info. Security, ISW 1997, Sep. 17-19, 1997, pp. 121-134, Tatsunokuchi, Japan.

Kinnunen, T., E. Karpov, P. Fränti, Real-time speaker identification and verification, IEEE Transactions on Audio, Speech & Language Processing, Jan. 2006, pp. 277-288, vol. 14, No. 1.

Liu, J., Z. Wang, L. Zhong, J. Wickramasuriya, V. Vasudevan, uWave: Accelerometer-based personalized gesture recognition and its applications, J. Pervasive and Mobile Computing, Dec. 2009, pp. 657-675, vol. 5, No. 6, Amsterdam, The Netherlands.

Lu, H., F. Claret-Tournier, C. R. Chatwin, R. C. D. Young, M-Commerce secured using web-enabled mobile biometric agents, Proc. of the 2007 IEEE/WIC/ACM Int'l Conf. on Web Intelligence and Int'l Conf. on Intelligent Agent Tech., Nov. 2-5, 2007, pp. 480-483, Silicon Valley, CA, USA.

Manber, U., A simple scheme to make passwords based on one-way functions much harder to crack. Department of Computer Science, University of Arizona, Nov. 1994, pp. 1-6.

Morgan Stanley, Mobile ramping faster than desktop internet did and will be bigger than most think, thanks to five converging trends: 3G + social networking + video + VoIP + impressive mobile devices, The Mobile Internet Report, Dec. 2009, pp. 83-125.

Pocovnicu, A., Biometric security for cell phones, Informatica Economica, 2009, pp. 57-63, vol. 13, issue 1.

Ross, B., C. Jackson, N. Miyake, D. Boneh, J. C. Mitchell, Stronger password authentication using browser extensions, Proc. of the 14th Conf. on USENIX Security Symposium, SSYM 2005, Jul.-Aug. 2005, pp. 15, vol. 14, Baltimore, MD.

Sasse, A., I. Flechais, Usable security: Why do we need it? How do we get it?, Usable Security, Aug. 2005, pp. 13-30, Ch. 2.

Vance, A., If your password is 123456, just make it hackme, New York Times, Jan. 2010, pp. 1-4.

Plecha, Thaddeus J., U.S. Office Action, U.S. Appl. No. 13/110,939, Oct. 5, 2012.

Plecha, Thaddeus J., U.S. Final Office Action, U.S. Appl. No. 13/110,939, Feb. 14, 2013.

* cited by examiner

FIG. 5

SENSOR-BASED AUTHENTICATION TO A COMPUTER NETWORK-BASED SERVICE

BACKGROUND

People are increasingly dependent on the Internet and in particular on the World Wide Web. For example, the Web is often used to access emails, conduct business, purchase goods and services, and for online banking, to name just a few things. Many of these activities involve interaction with a Web service via a Web site.

Web services often require proper user authentication to identify a user and establish secure channels with a remote computing device, such as a user's mobile computing device. A Web site associated with this type of Web service is sometimes referred to as a secure site. Although many secure authentication schemes have been proposed, an authenticating textual password is still dominantly used in Web applications due to its convenience, and ease in use and deployment. In password-based user authentication, a user is required to input a textual password to gain access to a service.

SUMMARY

This Summary is provided to introduce a selection of concepts, in a simplified form, that are further described below in the Detailed Description. This Summary is not intended to identify key features or essential features of the claimed subject matter, nor is it intended to be used as an aid in determining the scope of the claimed subject matter.

Sensor-based authentication technique embodiments described herein generally employ sensor readings captured by a user's computing device to authenticate the user's access to a computer network-based service that is secured with traditional textual passwords. These traditional passwords are saved by a password repository service that the user's computing device communicates with over the computer network. The password repository service authenticates access to a user-specified computer network-based service with the aforementioned sensor readings captured with the user's computing device.

In one embodiment, the user's computing device first communicates with the password repository service server over the computer network in order to request access to a password protected network-based service specified in the communication. The server receives the request and in one version sends a prompt to the computing device prompting the user to cause the device to generate and stream the aforementioned sensor-based password. The user's computing device receives the prompt from the password repository service, and in response generates and streams a non-cached, sensor-based password to the service. The password repository service, then determines if the received password substantially matches a sensor-based password resident on the password repository server which has been pre-arranged to authenticate the remote computing device's right to access the specified password protected network-based service. If a match is found, in one version, the server submits an authenticating password to the specified password protected network-based service via the computer network. This authenticating password has been pre-arranged to allow the remote computing device's access to the service. Communications between the specified password protected network-based service and the user's computing device then commence.

DESCRIPTION OF THE DRAWINGS

The specific features, aspects, and advantages of the disclosure will become better understood with regard to the following description, appended claims, and accompanying drawings where:

DETAILED DESCRIPTION

In the following description of sensor-based authentication technique embodiments reference is made to the accompanying drawings which form a part hereof, and in which are shown, by way of illustration, specific embodiments in which the technique may be practiced. It is understood that other embodiments may be utilized and structural changes may be made without departing from the scope of the technique.

1.0 Sensor-Based Authentication

Sensor-based authentication technique embodiments described herein generally employ sensor readings captured by a user's computing device (such as a mobile computing device like a cell phone, smart phone, PDA, and so on) to authenticate the user's access to a computer network-based service (such as a web-service) that is secured with traditional textual passwords. These traditional passwords are saved in an off-device password repository. The repository authenticates access thereto with the aforementioned sensor readings captured with the user's computing device.

More particularly, sensor readings are taken whenever the user intends to access a password protected service over a computer network (such as the Internet or a proprietary intranet) via a server running a password repository service secured with the sensor-based password. These readings are not cached on the device and are immediately streamed to the password repository service, where they are validated against a pre-arranged, known sensor-based password. If the validation succeeds, access to the password protected service is brokered by the password repository service on behalf of the user and the user's computing device is granted access.

1.1 Computer Network Environment Architecture

Before the sensor-based authentication technique embodiments are described in more detail, a description of a suitable computer network environment architecture in which portions thereof may be implemented will be described. Generally, there are one or more user computing devices (and typically many) which are in communication via a common computer network with a password repository service server. This server is in turn in communication with one or more (and typically many) password protected service servers. It is noted that while the foregoing description mentions just one password repository service server, this server could actually be a bank of servers as needed. The same is true for each of the password protected service servers.

Figure 1:
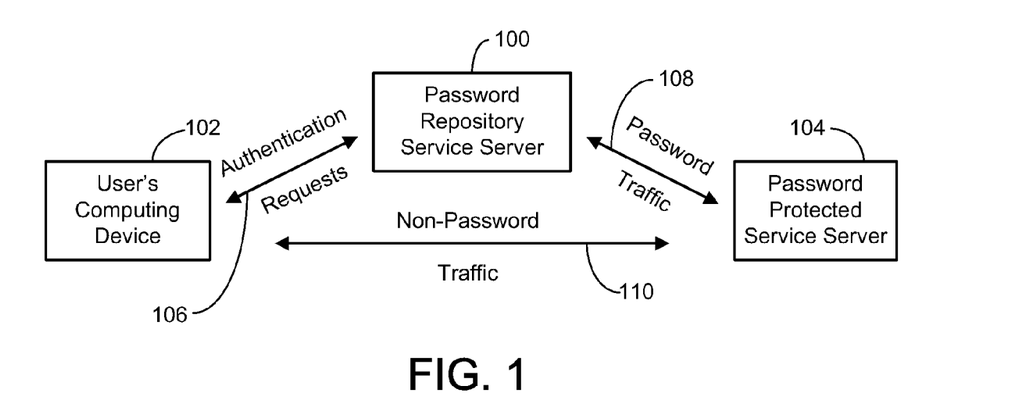
FIG. 1 is a diagram of an exemplary computer network environment architecture on which sensor-based authentication technique embodiments described herein may operate when the password repository service server acts as a broker in a password exchange protocol between a user's computing device and a specified password protected service.

More particularly, in one embodiment depicted in FIG. 1, the password repository service server 100 can be considered to be a broker in a password exchange protocol between users' computing devices 102 (one of which is shown) and password protected service servers 104 (one of which is shown). The password repository service server 100 handles authentication requests 106 from a user computing device 102. If a user computing device 102 is authenticated (as will be described in more detail later), the password repository service server 100 then handles the password traffic 108 with a specified password protected service server 104 (as will be described in more detail later). It is noted that the term password traffic is used as the pre-arranged password that allows a computing device's access to a specified password protected service may be required more than once during communications between the user computing device and the password protected service. All non-password related communication traffic 110 occurs directly between the user's computing device 102 and the specified password protected service 104 in this embodiment, thus bypassing the password repository service server 100.

Figure 2:
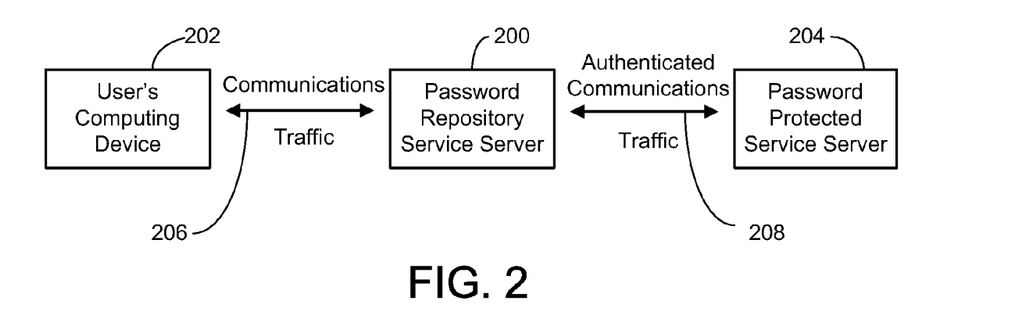
FIG. 2 is a diagram of an exemplary computer network environment architecture on which sensor-based authentication technique embodiments described herein may operate when the password repository service server acts as a transparent proxy for all communication between a user's computing device and a specified password protected service.

In another embodiment of a suitable computer network environment depicted in FIG. 2, the password repository service server 200 can be considered to be a transparent proxy for all communication between users' computing devices 202 (one of which is shown) and password protected service servers 204 (one of which is shown). In this embodiment, the password repository service server 200 handles all communications traffic 206 from and to user computing device 202 to either the password repository service server or a password protected service server 204, including the aforementioned authentication requests. If a user computing device 202 is authenticated, the password repository service server 200 then handles all authenticated communications traffic between computing device 202 and the password protected service server 204, including the aforementioned password traffic 208.

It is noted that the communication protocol between the user computing device 202 and the password repository service server 204 is over a secure channel. This prevents an adversary from overhearing the sensor-based password and replaying it to the password repository service to gain access to a password protected service server 204. For example, a common practice for establishing such a secure channel is to use an SSL protocol.

1.2 Sensor-Based Authentication Process

Figure 3:
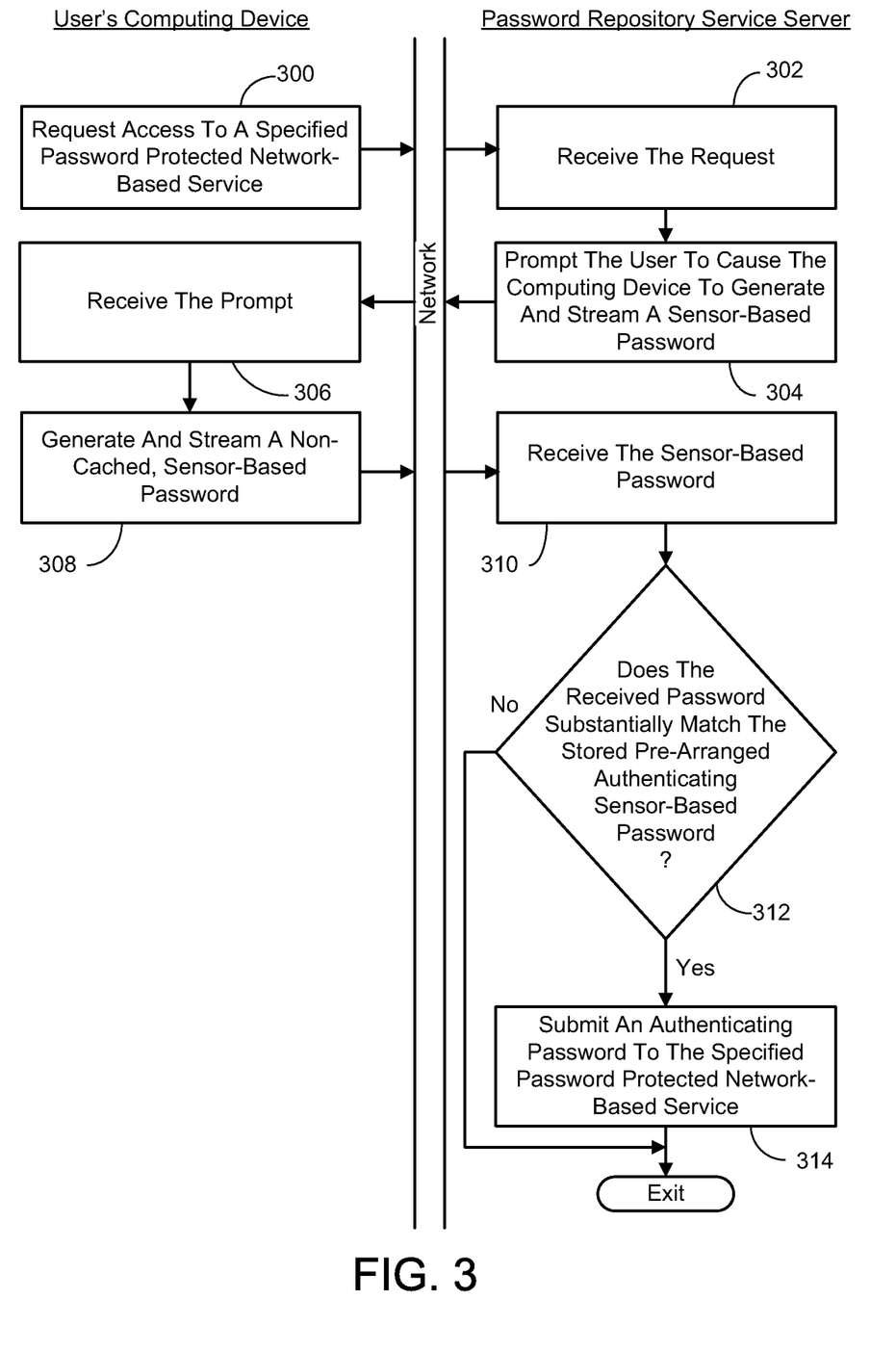
FIG. 3 is a flow diagram generally outlining one embodiment of a process for sensor-based authentication.

The foregoing architecture can be employed to realize the sensor-based authentication technique embodiments described herein. One general implementation is illustrated in FIG. 3. In this exemplary process, computers (such as the computing devices described in the Computing Environment section provided later in this specification) are employed to perform a series of process actions. More particularly, the aforementioned user's computing device and password repository service server are used. The user's computing device is first used to communicate with the password repository service server over a computer network in order to request access to a password protected network-based service specified in the communication (300). The server receives the request from the remote computing device (302), and in one version shown in FIG. 3, sends a prompt to the computing device via the computer network prompting the user to cause the device to generate and stream a sensor-based password (304). The user's computing device receives the prompt from the password repository service server (306), and then generates and streams a non-cached, sensor-based password to the server over the computer network (308). The password repository service server receives the sensor-based password (310), and next determines if the received password substantially matches a sensor-based password resident on the password repository server which has been pre-arranged to authenticate the remote computing device's right to access the specified password protected network-based service (312). If not, access is denied and the process ends. However, if a match is found, the server submits an authenticating password (which is typically textual) to the specified password protected network-based service via the computer network (314). This authenticating password has been pre-arranged to allow the remote computing device's access to the service. Communications between the specified password protected network-based service and the user's computing device then commence.

It is noted that in one implementation, the sensor-based password generated and streamed by the user's computing device substantially matches the sensor-based password resident on the password repository server when it matches to a prescribed degree. The particular degree will depend on the nature of the sensor-based password and the sensors used to generate it. Several sensor-based password types will be described in a section to follow. Given a particular sensor-based password type, the degree to which two passwords would need to correspond to qualify as matching can be readily established.

The foregoing sensor-based authentication has many advantages. For example, it leverages the insight that almost all of today's private information accessed from mobile computing devices is accessed via computer network-based services that maintain this type of data. Misuse of this information by an unscrupulous person who unrightfully gains access may result in significant damages. The foregoing sensor-based authentication secures access to services accessed from the device, and so the personal information maintained by these services. In addition, since the sensor-based password is not cached on the user's computing device, and because passwords to password protected network-based services are stored on the password repository service server rather than on the user's computing device, security is maintained even if the software or hardware associated with the user's computing device is compromised. For instance, should the device be lost, stolen or attacked via the computer network, an unscrupulous person would not know how to reproduce the valid sensor readings needed to generate the sensor-based password and so will be unable to access sensitive content stored by web-services.

Further, as will become apparent in the description of sensor-based passwords to be provided shortly, these types of passwords can be more intuitive and easier to remember than traditional textual passwords. As such they can be readily repeated by a user and so there is little incentive to cache the password on the computing device where it could be compromised.

The foregoing process generally describes how a user can authenticate with the password repository service server to gain access to a password protected network-based service. However, a user has to first register their computing device with the password repository service. In addition, for each password protected network-based service the user desires to access, an authenticating password that has been pre-arranged to allow the computing device's access to that password protected network-based service has to be provided to the password repository service. These two processes will be described in the sections to follow.

1.2.1 Registration

A user has to first register a computing device with the password repository service and create a sensor-based password before he or she can authenticate with the password repository service server to gain access to a password protected network-based service. In general, the user first logs onto the password repository service where they can identify their computing device, and associates basic information with the device. The user then is requested to create a sensor-based password and stream it to the password repository service. The user is not allowed to save this sensor-based password on their device.

Figure 4:
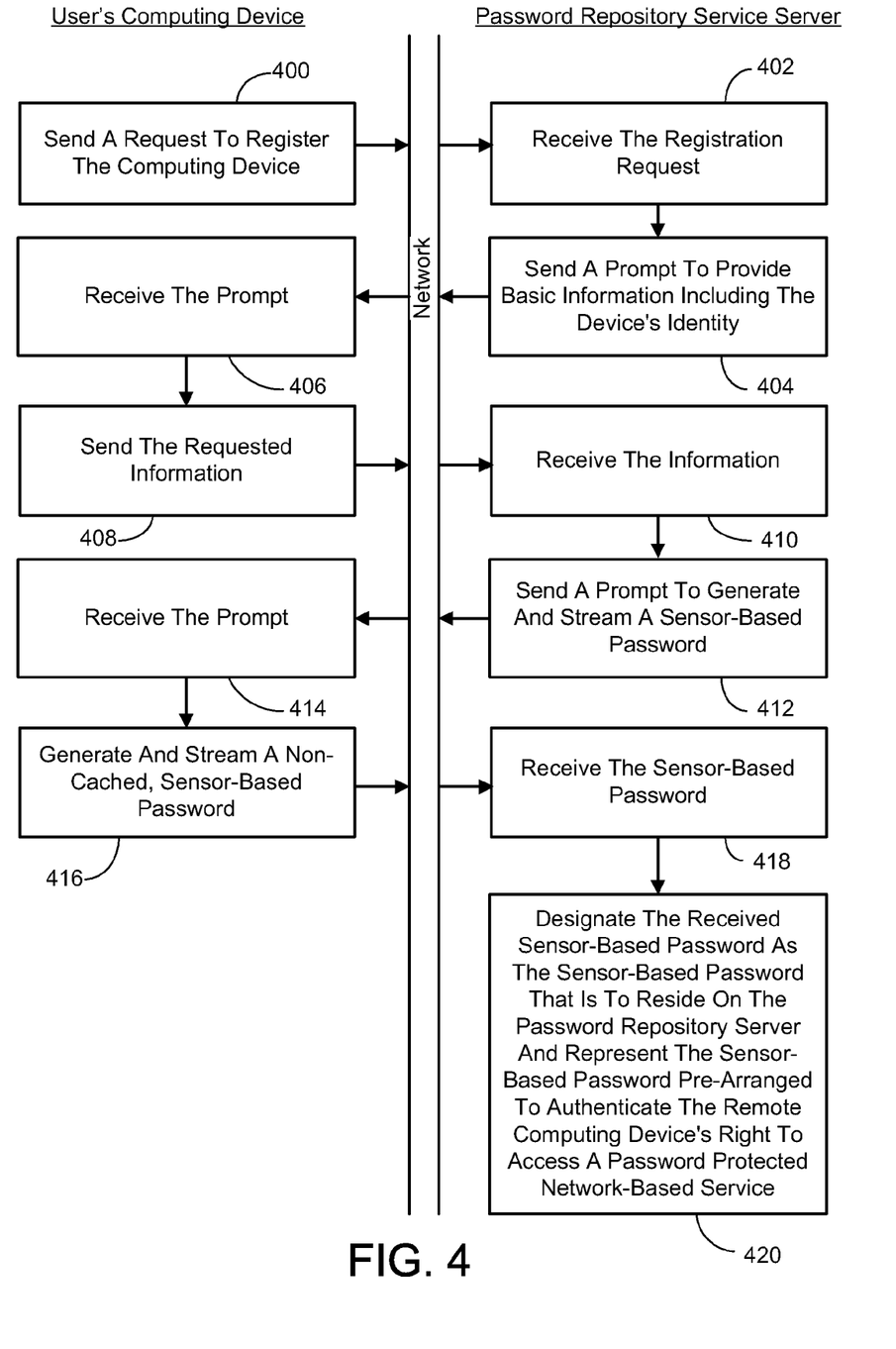
FIG. 4 is a flow diagram generally outlining one embodiment of a process for registering a computing device with the password repository service and creating a sensor-based password.

One implementation of the registration process is illustrated in FIG. 4. The user through his or her computing device first sends a request via the computer network to the password repository service to register the computing device (400). The password repository service server receives the registration request (402), and sends a prompt via the computer network to the user's remote computing device to provide basic information including the device's identity (404). The user's computing device receives this prompt (406), and sends the requested information to the password repository service (408). The password repository service receives the information (410), and in response sends a prompt via the computer network to the remote computing device to generate and stream a sensor-based password to the password repository server (412). The computing device receives this prompt (414); and generates and sends the sensor-based password to the password repository service via the computer network (416). As indicated previously, the sensor-based password is not cached on the computing device, but rather re-generated each time it is needed. The password repository service receives the sensor-based password from the remote computing device (418), and designates it as the sensor-based password that is to reside on the password repository server and represent the sensor-based password pre-arranged to authenticate the remote computing device's right to access the specified password protected network-based service or services (420).

It is noted that a separate sensor-based password must be associated with each user computing device even if the same user is involved because slight variations in types of device sensors can result in radically different sensor readings. However, this has a distinct security advantage. Namely, the authentication process will validate two conditions, instead of one. First, that the matching sensor-based password has been provided, and second that the password was sent from the computing device associated with that sensor-based password. This makes it much more difficult to attack the password repository service from a computing device that is not registered by the user, since the device identity as well as its sensor attributes must also be forged by the attacker.

It is also noted that in one implementation, standard best practices for password generation are followed in creating a sensor-based password. For instance, the user should generate their sensor-based password twice and these passwords must match to make sure that the user can reproduce the sensor pattern. This is advantageous because there may be variations in the sensing environment and it may not be immediately obvious to the user what impacts sensor readings (e.g. tilting the phone back vs. front). As another example of a best practice, the password repository service would reject short or simple sensor readings. For instance, a reading that is blank or that has too much periodicity or is too predictable (an analogy here is to textual passwords that are composed of popular words) may be easily replicated by an attacker and should therefore be disallowed by the service.

1.2.2 Providing an Authenticating Password

Once a user's computing device is registered, the user can authenticate with the password repository service to submit their authenticating (typically textual) password that has been pre-arranged to allow the computing device's access to a password protected network-based service.

Figure 5:
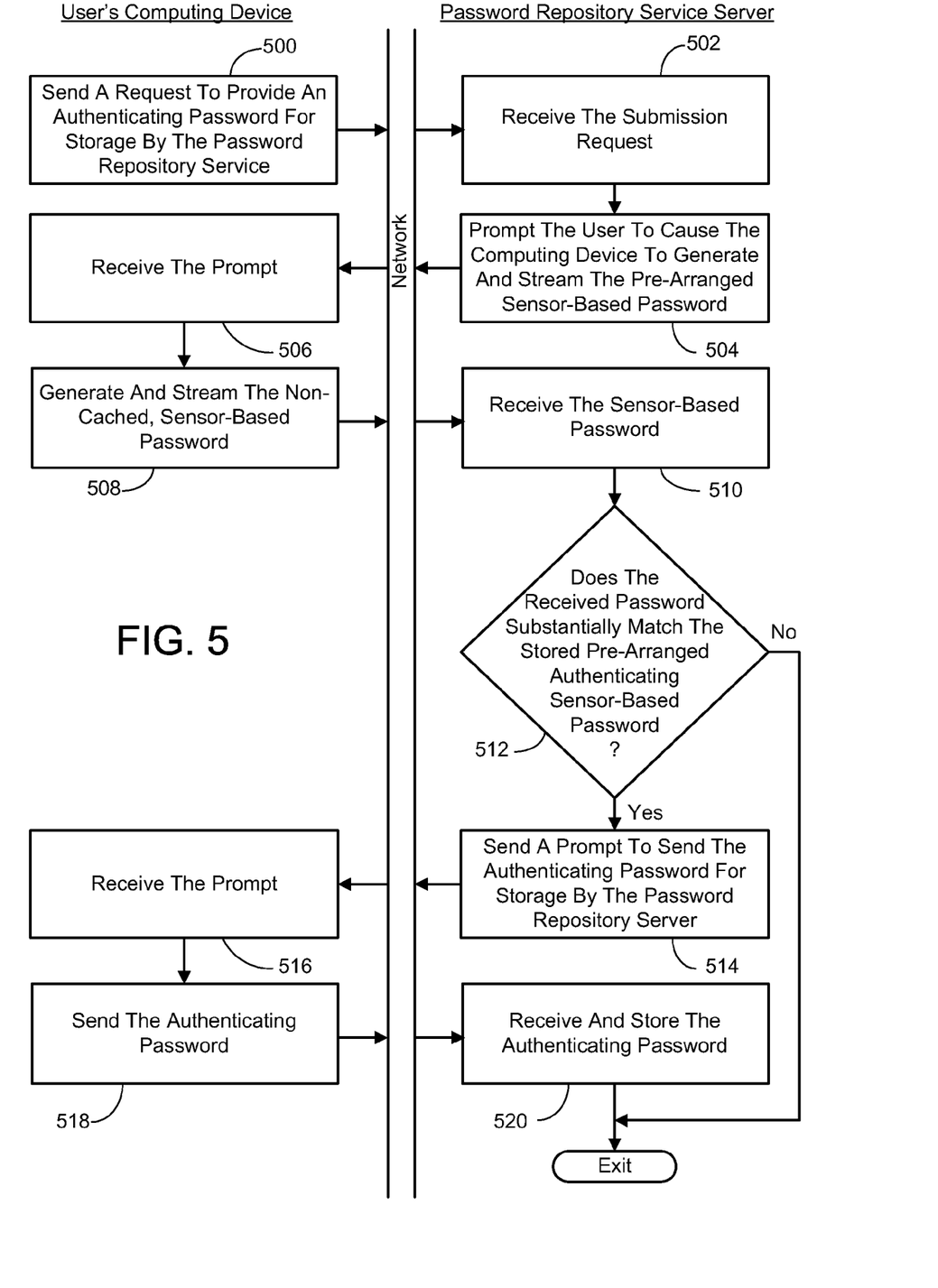
FIG. 5 is a flow diagram generally outlining one embodiment of a process for a submitting an authenticating password to the password repository service that has been pre-arranged to allow a user's computing device access to a password protected network-based service.

One implementation of the password submission process is illustrated in FIG. 5. The user through his or her computing device first sends a request via the computer to the password repository service to allow the computing device to provide an authenticating password for storage by the password repository service (500). The password repository service receives the submission request (502), and sends a prompt to the remote computing device via the computer network prompting the user of the remote computing device to cause the device to generate and stream the pre-arranged sensor-based password to the password repository server (504). The computing device receives this prompt (506), and in response generates and streams the pre-arranged (non-cached) sensor-based password to the password repository service (508). The password repository service receives the sensor-based password (510), and next determines if the received password substantially matches the sensor-based password resident on the password repository server which has been pre-arranged to authenticate the remote computing device's right to provide the authenticating password for storage by the password repository server (512). If not, access is denied and the process ends. However, if it is determined that the received sensor-based password matches the sensor-based password resident on the password repository server to a prescribed degree, a prompt is sent to the computing device to send the authenticating password for storage by the password repository server (514). The computing device receives the prompt (516), and in response sends the authenticating password to the password repository service (518). The password repository service then receives and stores the authenticating password (520).

It is noted that once the computing device is authenticated by determining the received sensor-based password matches the sensor-based password resident on the password repository server, the user can also submit one or more additional authenticating passwords associated with other password protected network-based services. Further, the user can remove or change authenticating passwords from the password repository service.

1.3 Sensor-Based Passwords

Computing devices in general, and especially mobile computing devices, are becoming sensing platforms. Increasingly many of these devices include sensors such as a microphone, camera, global positioning system (GPS) unit, accelerometer, and so on. A sensor-based password is a signal, or a combination of signals, generated by possibly multiple sensors on a user's computing device.

Given the presence of the foregoing sensors, it is possible to generate a sensor-based password that is highly identifying of the user. For example, one form of such a password is a biometric measurement of the user's physiological or behavioral characteristics. In general, biometrics involves a way to uniquely identify an individual using one or more intrinsic physical or behavioral traits. Physiological biometric characteristics involve the physical attributes of a person. For example, the appearance of a person's face, or eye(s) is a physiological biometric characteristic of that person. Behavioral biometric characteristics (sometimes referred to as behaviometric characteristics) generally involve the behavior of a person. For example, a person's gait or the way a person speaks. Thus, when the user's computing device includes at least one sensor whose output can be used to characterize the physiological biometric traits of a user, behavioral biometric traits of a user, or both, then a biometric sensor-based password can be generated and streamed to the password repository service.

However, the sensor-based authentication technique embodiments described herein are not limited to just biometric sensor-based passwords. Rather, the password may also be loosely associated with the user's identity, as long as a secure sensor-based password is generated that is difficult to reproduce without the user's presence and permission. For example, an image of the user's physical key to their home could be used as a non-biometric sensor-based password.

Below is a listing of a few different types and specific examples of sensor-based passwords and the sensors that would be used to generate the password. It is noted that the list is exemplary in nature only. It is anticipated that many more biometric and non-biometric sensor-based passwords could be generated, and it is not intended to limit the sensor-based authentication technique embodiments to just those listed.

When the user's computing device includes a microphone, a user's voice can be recorded and the recording designated as a sensor-based password. For example, the user could read a prescribed sentence designed to elicit the unique characteristics of the user's voice. In addition, when the user's computing device includes a microphone, a temporal pattern of sounds can be produced by the user and employed as a sensor-based password. For example, the user could produce a pattern of air blows near to the microphone, a pattern of finger snaps, or a temporal pattern of taps on the microphone.

When the user's computing device includes a camera, one or more images of a user's face or eye(s) can be captured and designated as the sensor-based password. In addition, the camera can be used to capture an image of the shape of a user's hand, or some user-identifying article (e.g., the aforementioned house key), and the image would be employed as the sensor-based password. Further, if the user's computing device has a high resolution camera, an image of the fingerprint on one of his or her fingers, or a user's palm print, can be used as the sensor-based password. Likewise, a high resolution camera could be used to capture an image of a user's iris and this image can be the sensor-based password.

When the user's computing device includes one or more accelerometers, the output signal from each of the accelerometers can be captured while a user moves the computing device in a particular manner. The output signal for the accelerometer(s) can then be used as the sensor-based password. For example, a user's gait could be captured in this manner. Additionally, the user could move the computing device in some memorable pattern to produce a sensor-based password using the accelerometer(s) output.

When the user's computing device includes a touch screen, the user could taps out a memorable geometric and/or temporal pattern on the screen while the pattern is recorded. This pattern would then be used as the sensor-based password.

It is noted that the sensor-based password can also be combinations of the foregoing as desired.

1.4 Password Repository Service Attributes

For the password repository service to be trusted and usable by a user's computing device, it would be highly available. For example, a user's mobile computing device may have intermittent connectivity to the computer network, and may connect at any time of the day. Thus, the password repository service would be available for a user to access their stored passwords at all times.

The password repository service would also be highly reliable. Because passwords are critical for accessing sensitive information, the storage maintaining these passwords is safeguarded against all possible forms of infrastructure failure.

Further, the password repository service would provide sufficient computing resources to validate sensor-based passwords. It is important for the authentication to occur within the password repository service server rather than the user's computing device. Otherwise the security of the sensor-based password would be compromised. An additional reason for this is that the validation procedure may be too computationally expensive when the user's computing device is relatively resource-poor, such as when it is a mobile computing device.

Still further, the password repository service would maintain the passwords in a highly secure environment.

2.0 The Computing Environment

A brief, general description of a suitable computing environment in which portions of the sensor-based authentication technique embodiments described herein may be implemented will now be described. The technique embodiments are operational with numerous general purpose or special purpose computing system environments or configurations. Examples of well known computing systems, environments, and/or configurations that may be suitable include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

Figure 6:
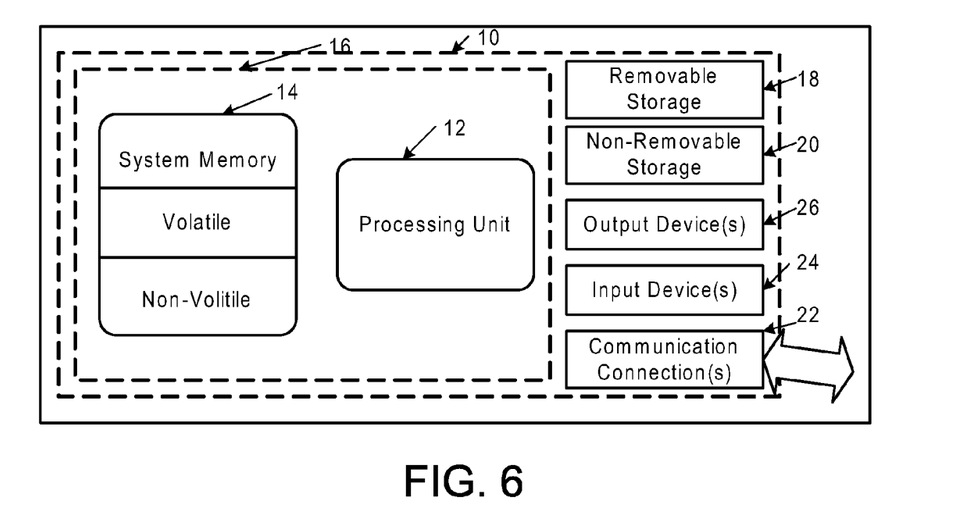
FIG. 6 is a diagram depicting a general purpose computing device constituting an exemplary system for implementing sensor-based authentication technique embodiments described herein.

FIG. 6 illustrates an example of a suitable computing system environment. The computing system environment is only one example of a suitable computing environment and is not intended to suggest any limitation as to the scope of use or functionality of sensor-based authentication technique embodiments described herein. Neither should the computing environment be interpreted as having any dependency or requirement relating to any one or combination of components illustrated in the exemplary operating environment. With reference to FIG. 6, an exemplary system for implementing the embodiments described herein includes a computing device, such as computing device 10. In its most basic configuration, computing device 10 typically includes at least one processing unit 12 and memory 14. Depending on the exact configuration and type of computing device, memory 14 may be volatile (such as RAM), non-volatile (such as ROM, flash memory, etc.) or some combination of the two. This most basic configuration is illustrated in FIG. 6 by dashed line 16. Additionally, device 10 may also have additional features/functionality. For example, device 10 may also include additional storage (removable and/or non-removable) including, but not limited to, magnetic or optical disks or tape. Such additional storage is illustrated in FIG. 6 by removable storage 18 and non-removable storage 20. Computer storage media includes volatile and nonvolatile, removable and non-removable media implemented in any method or technology for storage of information such as computer readable instructions, data structures, program modules or other data. Memory 14, removable storage 18 and non-removable storage 20 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by device 10. Any such computer storage media may be part of device 10.

Device 10 may also contain communications connection(s) 22 that allow the device to communicate with other devices. Device 10 may also have input device(s) 24 such as keyboard, mouse, pen, voice input device, touch input device, camera, etc. Output device(s) 26 such as a display, speakers, printer, etc. may also be included. All these devices are well know in the art and need not be discussed at length here.

The sensor-based authentication technique embodiments described herein may be further described in the general context of computer-executable instructions, such as program modules, being executed by a computing device. Generally, program modules include routines, programs, objects, components, data structures, etc. that perform particular tasks or implement particular abstract data types. The embodiments described herein may also be practiced in distributed computing environments where tasks are performed by remote processing devices that are linked through a communications network. In a distributed computing environment, program modules may be located in both local and remote computer storage media including memory storage devices.

3.0 Other Embodiments

In the foregoing description of the sensor-based authentication technique embodiments, an authenticating password pre-arranged between a user of a remote computing device and a password protected network-based service to authenticate the user's right to access the service, has been stored on the password repository service server and supplied by it to the password protected network-based service to authenticate the computing device. However, in an alternate embodiment, there is no authenticating password pre-arranged between the user of a remote computing device and the password protected network-based service. Rather, arrangements are made between the password repository service and a password protected network-based service that a remote computing device user wishes to access for obtaining authorization to allow the remote computing device's access to the service. This arrangement may involve an authenticating password or not. In this alternate embodiment, when a computing device presents a bona fide sensor-based password to the password repository service, this establishes the device user's right to access the pre-arranged password protected network-based service. Thus, the user does not supply and the password repository service does not store authenticating passwords prearranged by the user with a password protected network-based service.

It is noted that any or all of the aforementioned embodiments throughout the description may be used in any combination desired to form additional hybrid embodiments. In addition, although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

Wherefore, what is claimed is:

1. A computer-implemented process for accessing a password protected service over a computer network via a password repository service, comprising:
   using a computing device to perform the following process actions:
   sending a request via the computer network to the password repository service to register the computing device;
   receiving a prompt via the computer network from the password repository service to provide information comprising the computing device's identity;
   sending said information comprising the device's identity to the password repository service via the computer network;
   receiving a prompt via the computer network from the password repository service to generate and stream a non-cached, sensor-based password to the password repository server;
   generating and sending the non-cached, sensor-based password to the password repository service via the computer network;
   communicating with the password repository service over the computer network to request access to a password protected network-based service specified in the communication;
   generating and streaming the non-cached, sensor-based password to the password repository service over the computer network, wherein the non-cached, sensor-based password has been pre-arranged with the password repository service to authenticate authorization to access the specified password protected network-based service; and
   communicating with the specified password protected network-based service.

2. The process of claim 1, wherein prior to performing the process action of generating and streaming a non-cached, sensor-based password to the password repository service, performing a process action of receiving a prompt from the password repository service to generate and stream the non-cached, sensor-based password.

3. The process of claim 1, wherein the process action of communicating with the specified password protected network-based service, comprises an action of communicating with the specified password protected network-based service directly via the computer network.

4. The process of claim 1, wherein the process action of communicating with the specified password protected network-based service, comprises an action of communicating with the specified password protected network-based service through the password repository service via the computer network.

5. The process of claim 1, wherein said computing device comprises at least one sensor whose output is used to characterize physiological biometric traits of a user, behavioral biometric traits of a user, or both, and wherein the process action of generating the non-cached, sensor-based password, comprises the actions of:

employing the output of said at least one sensor to characterize prescribed physiological biometric traits of a user, prescribed behavioral biometric traits of a user, or both; and     designating the output of said at least one sensor characterizing the prescribed physiological biometric traits of a user, prescribed behavioral biometric traits of a user, or both, to be the non-cached, sensor-based password.

6. The process of claim 1, wherein said computing device comprises at least one sensor whose output is used to characterize a non-biometric feature associated with a user, and wherein the process action of generating the non-cached, sensor-based password, comprises the actions of:

employing the output of said at least one sensor to characterize a prescribed non-biometric feature associated with the user; and     designating the output of said at least one sensor characterizing the prescribed non-biometric feature associated with the user, to be the non-cached, sensor-based password.

7. The process of claim 1, wherein said computing device comprises a microphone, and wherein the process action of generating the non-cached, sensor-based password, comprises the actions of:

recording at least one of, a user's voice, or a temporal pattern of sounds generated by the user, using the microphone; and     designating the recording to be the non-cached, sensor-based password.

8. The process of claim 1, wherein said computing device comprises a camera, and wherein the process action of generating the non-cached, sensor-based password, comprises the actions of:

capturing one or more images of one of, a user's face, or a user's eye, using the camera; and     designating the captured image or images to be the non-cached, sensor-based password.

9. The process of claim 1, wherein said computing device comprises a camera, and wherein the process action of generating the non-cached, sensor-based password, comprises the actions of:

capturing an image of one of, a user's fingerprint, or a user's house key, using the camera; and     designating the captured image to be the non-cached, sensor-based password.

10. The process of claim 1, wherein said computing device comprises one or more accelerometers, and wherein the process action of generating the non-cached, sensor-based password, comprises the actions of:

recording an output signal from each of said one or more accelerometers while a user moves the computing device in a particular manner; and     designating the recorded output signal from said one or more accelerometers to be the non-cached, sensor-based password.

11. The process of claim 1, wherein an authenticating password pre-arranged between a user of the computing device and the specified password protected network-based service to authenticate the user's right to access the service is provided to the specified password protected network-based service by the password repository service before any communications between the computing device and the specified password protected network-based service occur, and wherein prior to performing the process action of communicating with the password repository service over the computer network to request access to the password protected network-based service specified in the communication, the process comprises performing the actions of:

sending a request via the computer network to the password repository service to allow the computing device to provide said authenticating password for storage by the password repository service;

receiving a prompt from the password repository service via the computer network prompting a user of the computing device to cause the device to generate and stream the non-cached, sensor-based password to the password repository service;

generating and streaming the non-cached, sensor-based password to the password repository service via the computer network;

receiving a prompt from the password repository service to send the authenticating password for storage by the password repository server; and     sending the authenticating password to the password repository service.

12. A computer-implemented process for using a password repository server to facilitate a remote computing device's access to a password protected service over a computer network, comprising:

using the password repository server to perform the following process actions:

receiving a request via the computer network from the remote computing device to register the remote computing device;

sending a prompt via the computer network to the remote computing device to provide information comprising the device's identity;

receiving said information comprising the device's identity from the remote computing device via the computer network;

sending a prompt via the computer network to the remote computing device to generate and stream an authenticating sensor-based password to the password repository server;

receiving the authenticating sensor-based password from the remote computing device via the computer network;

designating the received authenticating sensor-based password to be the sensor-based password that resides on the password repository server and which represents the sensor-based password pre-arranged to authenticate the remote computing device's right to access a password protected network-based service;

receiving a request via the computer network from the remote computing device to obtain access to a password protected network-based service specified in the request;

receiving a sensor-based password via the computer network which was generated and streamed, without caching, by the remote computing device;

determining if the received sensor-based password matches the sensor-based password resident on the password repository server which has been pre-arranged to authenticate the remote computing device's right to access the specified password protected network-based service; and     whenever it is determined that the received sensor-based password matches said sensor-based password resident on the password repository server, submitting an authenticating password to the specified password protected network-based service via the computer network, wherein the authenticating password submitted to the specified password protected network-based service has been pre-arranged to allow the remote computing device's access to the service.

13. The process of claim 12, wherein prior to performing the process action of receiving a sensor-based password, performing a process action of sending a prompt to the remote computing device via the computer network prompting a user of the remote computing device to cause the device to generate and stream the sensor-based password.

14. The process of claim 12, wherein the authenticating password is a password pre-arranged between a user of the remote computing device and the specified password protected network-based service to authenticate the user's right to access the service, and wherein said password was received from the remote computing device and stored by the password repository server.

15. The process of claim 12, wherein the authenticating password is a password pre-arranged between the password repository server and the specified password protected network-based service to authenticate a remote computing device user's right to access the service, and wherein said authenticating password was generated by the password repository server.

16. The process of claim 12, wherein the authenticating password is a password pre-arranged between a user of the remote computing device and the specified password protected network-based service to authenticate the user's right to access the service, and wherein the process further comprises the actions of:

receiving a request via the computer network from the remote computing device to provide said authenticating password for storage by the password repository server;

sending a prompt to the remote computing device via the computer network prompting a user of the remote computing device to cause the device to generate and stream the sensor-based password to the password repository server;

receiving the sensor-based password via the computer network which was generated and streamed, without caching, by the remote computing device;

determining if the received sensor-based password matches a sensor-based password resident on the password repository server which has been pre-arranged to authenticate the remote computing device's right to provide the authenticating password for storage by the password repository server;

whenever it is determined that the received sensor-based password matches said sensor-based password resident on the password repository server, prompting the remote computing device to send the authenticating password for storage by the password repository server; and receiving and storing the authenticating password.

17. The process of claim 12, further comprising the process action of acting as a transparent proxy for all communications via the computer network between the remote computing device and the specified password protected network-based service.

* * * * *